United States Patent
Watanabe et al.

(10) Patent No.: US 10,815,974 B2
(45) Date of Patent: Oct. 27, 2020

(54) METHOD OF REPAIRING OR REINFORCING WIND TURBINE BLADE, OR ATTACHING ACCESSORY PART TO WIND TURBINE BLADE

(71) Applicant: MITSUBISHI HEAVY INDUSTRIES, LTD., Tokyo (JP)

(72) Inventors: Naota Watanabe, Tokyo (JP); Hirokazu Yamasaki, Tokyo (JP); Yoshihiko Hayashi, Tokyo (JP); Eiji Kato, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 64 days.

(21) Appl. No.: 16/227,084

(22) Filed: Dec. 20, 2018

(65) Prior Publication Data

US 2019/0301433 A1    Oct. 3, 2019

(30) Foreign Application Priority Data

Mar. 29, 2018   (JP) .................................. 2018-064102

(51) Int. Cl.
*F03D 1/06* (2006.01)
*F03D 80/50* (2016.01)
(Continued)

(52) U.S. Cl.
CPC .............. *F03D 80/50* (2016.05); *B29C 73/10* (2013.01); *B29C 65/4845* (2013.01);
(Continued)

(58) Field of Classification Search
CPC ... Y02E 10/721; F03D 1/0633; F03D 1/0641; F03D 1/0675; F03D 1/0683; F03D 80/50;
(Continued)

(56) References Cited

U.S. PATENT DOCUMENTS 5,133,516 A * 7/1992 Marentic .................. B05D 5/02
244/130
9,498,923 B2    11/2016 Hesse
(Continued)

FOREIGN PATENT DOCUMENTS

JP    2008195744 A *   8/2008
JP    2008195744 A     8/2008
(Continued)

OTHER PUBLICATIONS

Office Action for Japanese Application No. 2018-064102 dated Jun. 25, 2019; 6pp.

*Primary Examiner* — Philip C Tucker
*Assistant Examiner* — Brian R Slawski
(74) *Attorney, Agent, or Firm* — Manabu Kanesaka; Benjamin Hauptman; Kenneth Berner

(57) ABSTRACT

A method of repairing or reinforcing, or attaching an accessory part to a wind turbine blade includes: determining a criterion to be satisfied by a repair member including a reinforcing fiber and a UV curable resin, the criterion being an adhesion strength of the repair member relative to a base member of the wind turbine blade; determining a work condition including: dimensions of the repair member, the number of the layers of the reinforcing fiber in the repair member, and/or a fiber extension direction of the reinforcing fiber, based on a damage condition of a repair target portion of the wind turbine blade; placing the reinforcing fiber and UV curable resin on the repair target portion based on the determined work condition; and obtaining the repair member by curing the UV curable resin so that the adhesion strength of the repair member relative to the base member satisfies the criterion.

12 Claims, 10 Drawing Sheets

(51) Int. Cl.
  *B29C 73/10* (2006.01)
  *B29C 65/00* (2006.01)
  *B29C 65/48* (2006.01)
  *B29C 65/82* (2006.01)
  B29L 31/08 (2006.01)
  B29C 35/08 (2006.01)

(52) U.S. Cl.
  CPC ........ *B29C 65/8223* (2013.01); *B29C 66/026* (2013.01); *B29C 66/0324* (2013.01); *B29C 66/0382* (2013.01); *B29C 66/0384* (2013.01); *B29C 66/301* (2013.01); *B29C 66/723* (2013.01); *B29C 66/7212* (2013.01); *B29C 2035/0827* (2013.01); *B29L 2031/085* (2013.01); *F03D 1/0658* (2013.01); *F03D 1/0675* (2013.01); *F05B 2230/80* (2013.01)

(58) Field of Classification Search
  CPC .. F03D 1/0658; Y02P 70/523; F05B 2230/80; F05B 2240/30; F05B 2240/32; F05B 2240/122; F05B 2260/96; F05B 2240/307; B29C 73/10; B29C 73/12; B29C 65/00; B29C 65/48; B29C 65/483; B29C 65/4845; B29C 65/50; B29C 65/5007; B29C 65/5014; B29C 65/5021; B29C 65/82; B29C 65/8207; B29C 65/8223; B29C 66/00; B29C 66/02; B29C 66/026; B29C 66/03; B29C 66/032; B29C 66/0324; B29C 66/038; B29C 66/0382; B29C 66/0384; B29C 66/301; B29C 66/47; B29C 66/4722; B29C 66/712; B29C 66/7212; B29C 66/723; B29C 2035/0827; Y10T 29/49337; B29L 2031/085; B29L 2031/08; B29L 2031/082
  USPC .. 156/60, 64, 71, 75, 94, 98, 196, 212, 213, 156/214, 215, 242, 245, 272.2, 275.5, 156/275.7, 278, 280, 307.1, 303.3; 29/889.1, 889.7, 889.71, 889.72; 416/224, 226, 229 R, 230, 235, 236 R, 416/241, 241 A
  See application file for complete search history.

(56) References Cited

U.S. PATENT DOCUMENTS

| | | | |
|---|---|---|---|
| 2003/0215766 A1* | 11/2003 | Fischer | A61C 19/004 433/29 |
| 2010/0135820 A1* | 6/2010 | Olson | F03D 1/0675 416/241 R |
| 2011/0044820 A1* | 2/2011 | Stenbaek Nielsen | B29C 70/547 416/223 R |
| 2012/0061007 A1* | 3/2012 | Gunther | B29C 65/4845 156/94 |
| 2013/0012086 A1* | 1/2013 | Jones | B29C 73/10 442/66 |
| 2013/0240118 A1* | 9/2013 | Fang | B29C 70/28 156/94 |
| 2014/0154089 A1* | 6/2014 | Traser | C09J 5/08 416/224 |
| 2014/0186175 A1* | 7/2014 | Baehmann | F03D 1/0675 416/1 |
| 2016/0338151 A1* | 11/2016 | Lindskog | B32B 38/0008 |
| 2016/0354999 A1* | 12/2016 | Shindo | B32B 5/024 |
| 2018/0126646 A1* | 5/2018 | Zitelli | B29C 64/124 |

FOREIGN PATENT DOCUMENTS

| | | | |
|---|---|---|---|
| KR | 101324978 B1 * | 11/2013 | |
| KR | 101324978 B1 | 11/2013 | |
| KR | 10-1668418 B1 * | 10/2016 | B24B 19/14 |

* cited by examiner

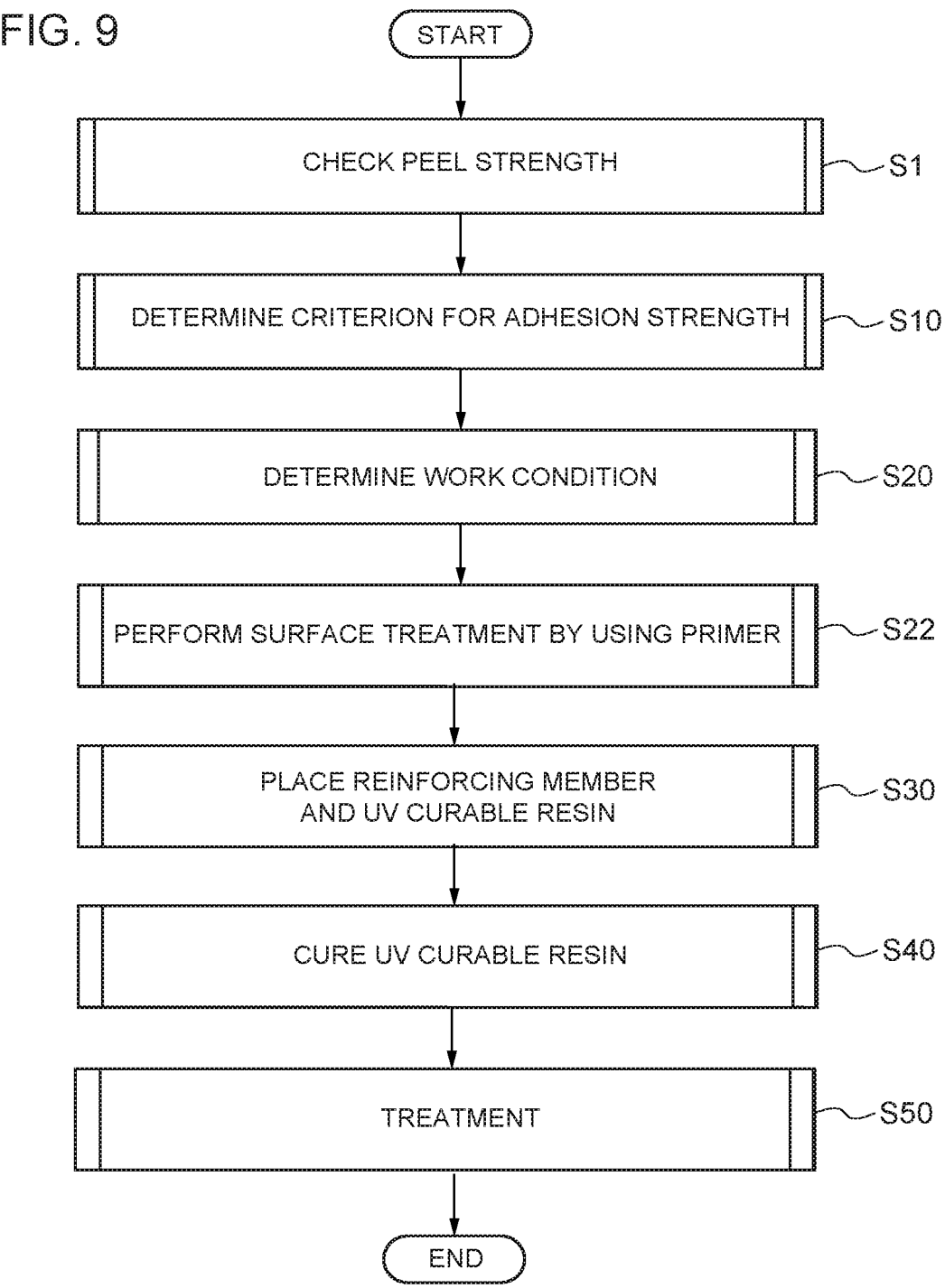

METHOD OF REPAIRING OR REINFORCING WIND TURBINE BLADE, OR ATTACHING ACCESSORY PART TO WIND TURBINE BLADE

RELATED APPLICATIONS

The present application claims priority from Japanese Application Number 2018-064102 filed Mar. 29, 2018, the disclosure of which is hereby incorporated by reference herein in its entirety.

TECHNICAL FIELD

The disclosure relates to a method of repairing or reinforcing a wind turbine blade, or attaching an accessory part to the wind turbine blade.

BACKGROUND

Typically, measures such as repairing or reinforcing (hereinafter, referred to as "repairing and the like") have been taken as appropriate for a damage on a wind turbine blade due to lightening or the like, for example.

Patent Document 1 discloses a repair member related to the repairing and the like for a wind turbine blade. Specifically, the repair member is obtained by attaching a double-layered supporting film on an attachment surface side of a fiber-matrix composite material used for the repairing, and attaching an ultraviolet (UV) protection film to a surface opposite to the attachment surface of the composite material. The repairing according to this Patent Document 1 is performed by: removing the double-layered supporting film; attaching the attachment surface to a blade surface; and after removing the UV protection layer, curing the composite material using UV radiation.

CITATION LIST

Patent Literature

Patent Document 1: U.S. Pat. No. 9,498,923B

SUMMARY

Unfortunately, with the technique described in Patent Document 1 described above, a strength of the repair member after attachment is difficult to determine.

In view of this, an object of at least one embodiment of the disclosure is to provide a method of repairing a wind turbine blade enabling the strength of a repair member after attachment to be determined.

(1) A method of repairing or reinforcing a wind turbine blade, or attaching an accessory part to the wind turbine blade according to at least one embodiment of the disclosure includes:

determining a criterion to be satisfied by a repair member including at least one layer of reinforcing fiber and a UV curable resin, the criterion being an adhesion strength of the repair member relative to a base member of a wind turbine blade;

determining a work condition including at least one of: dimensions of the repair member in a plan view, the number of the layers of the reinforcing fiber in the repair member, and a fiber extension direction of the reinforcing fiber, on the basis of a damage condition of a repair target portion of the wind turbine blade;

placing the reinforcing fiber and the UV curable resin on the repair target portion in accordance with the determined work condition; and obtaining the repair member by curing the UV curable resin, with the reinforcing fiber and the UV curable resin being placed on the repair target portion in a manner in which the adhesion strength of the repair member relative to the base member satisfies the criterion.

In the method according to (1) described above, the criterion for the adhesion strength of the repair member relative to the base member of the wind turbine blade, to be satisfied by the repair member, is determined, the work condition is determined on the basis of the damage condition of the repair target portion, the reinforcing fiber and the UV curable resin are placed on the repair target portion in accordance with the determined work condition, and the repair member is obtained by curing the UV curable resin, with the placing performed in a manner in which the adhesion strength of the repair member relative to the base member satisfies the criterion. Thus, the criterion is determined with the adhesion strength of the repair member relative to the base member of the wind turbine blade checked in advance. Then, the UV curable resin is cured to satisfy the criterion. Thus, the strength the repair member after the attachment can be determined. Thus, the repairing and the like can be performed at a low cost by using the repair member with a sufficient strength. Furthermore, for example, the repairing and the like can be performed by using the repair member that can be attached with a minimum possible impact on aerodynamics and the like of the wind turbine blade.

(2) In some embodiments, in the method according to (1) described above, the curing may include irradiating a prepreg material with UV, the prepreg material including at least one type of glass fiber and the UV curable resin.

In the method according to (2) described above, the prepreg material is used so that the UV curable resin needs not to be impregnated in the reinforcing glass fiber on site, whereby a work period can be largely shortened. The prepreg material can have a configuration set and selected in advance to satisfy the criterion for the adhesion strength relative to the base member, in accordance with the base member of the wind turbine blade. Thus, the repair member having a sufficient strength can be obtained while shortening the work period.

(3) In some embodiments, in the method according to (2) described above, the prepreg material may be contained in a bag having a light shielding property, the determination of work condition may include measuring dimensions of a target portion for repair, reinforcement, or accessory-part attachment after removing a coating film on a surface of the base member of the wind turbine blade from the target portion, and the placing may include, on the basis of the dimensions, cutting the prepreg material, contained in the bag, together with the bag, and removing the bag that has been cut, and then adhering the prepreg material to the repair target portion.

In the method according to (3) described above, the coating film on the base member of the wind turbine blade is removed from the target portion for repair, reinforcement, or accessory-part attachment, so that the dimensions of the target portion can be accurately measured. Furthermore, the prepreg material, contained in the bag, is cut on the basis of the measured dimension, so that the prepreg material, to be attached to the target portion, can be cut to have dimensions required for satisfying the criterion for the adhesion strength relative to the base member. The prepreg material is cut together with the bag having a light shielding property, so as not to be irradiated with light as much as possible before being adhered to the base member. Thus, the adhered prepreg material can more conform to the surface of the base member of the wind turbine blade, and an appropriate adhesion strength satisfying the criterion can be guaranteed.

(4) In some embodiments, the method according to (2) or (3) may further include a step of checking whether a peel strength of the prepreg material that has been cured is equal to or larger than 3 MPa.

In the method according to (4) described above, the prepreg material that has been checked to have a peel strength equal to or larger than 3 MPa after being cured can be used for repairing or reinforcing the wind turbine blade or for attaching an accessory part to the wind turbine blade. Thus, the determinations in steps for satisfying the criterion for the adhesion strength can be more appropriately made.

(5) In some embodiments, in the method according to any one of (2) to (4) described above, the UV curable resin may include vinyl ester or polyester and a UV curable agent impregnated in the vinyl ester or polyester.

In the method according to (5) described above, the effect described in any one of (1) to (4) described above can be obtained by using the repair member including the UV curable resin including vinyl ester or polyester and a UV curable resin impregnated in the vinyl ester or polyester.

(6) In some embodiments, in the method according to any one of (2) to (5) described above, the glass fiber may include at least one of unidirection (UD) where the fiber extension direction is uniform and a double bias mat (DBM) including at least two fiber layers with different extension directions.

In the method according to (6) described above, in the step for determining the work condition, at least one of the UD where the fiber extension direction of the reinforcing fiber is uniform and the DBM may be determined to be included, on the basis of the damage condition of the repair target portion in the wind turbine blade. Furthermore, in the step for the placing, the reinforcing fiber and the UV curable resin may be placed on the repair target portion in accordance with the work condition. The repair member can be formed with: the glass fiber including at least one of the UD and the DBM; and the UV curable resin. Thus, the repair member that is more effectively integrated with the base member can be used for repairing, reinforcing, and accessory-part attachment for the base member of the wind turbine blade including a fiber reinforced plastic (FRP) material or the like for example.

(7) In some embodiments, in the method according to any one of (2) to (6) described above, the placing may include using the prepreg material attached with a transparent film on each surface thereof, and the curing may include irradiating the prepreg material with the UV, with the transparent film being attached to an opposite surface of the prepreg material to a surface facing an outer skin of the wind turbine blade.

In the method according to (7) described above, the prepreg material can be irradiated with the UV, with the transparent film covering the upper surface of the prepreg material in close contact with the outer skin of the wind turbine blade. Thus, the resin can be cured while preventing the prepreg material from being dried or oxidized, losing shape, or having a foreign object attached thereon. The transparent film is peeled after the curing, so that the prepreg material can be easily handled during the repairing operation.

(8) In some embodiments, the method according to any one of (1) to (7) described above may further include a step of performing a surface treatment on the base member by using a primer that has unsaturated polyester and styrene as main components and is bondable to the UV curable resin, before implementing the placing.

In the method according to (8) described above, the surface treatment is performed on the base member by using the primer. This ensures a higher bonding or adhesion strength between the repair member and the base member.

(9) In some embodiments, in the method according to any one of (1) to (8) described above, the curing may include using a UV convergent irradiation device including a light source, and a concentrator or a diffuser arranged on an optical path of the light source.

In the method according to (9) described above, the UV emitted from the light source can be collected by the concentrator or diffused by the diffuser. With the UV convergent irradiation device thus used, the repair member can be more appropriately irradiated with the UV to be cured.

(10) In some embodiments, in the method according to any one of (1) to (9) described above, the curing may include irradiating the UV curable resin with the UV having a wavelength of approximately 380 nm and a light intensity of 150 w/cm$^2$ or more.

In the method according to (10) described above, the UV curable resin can be effectively cured in a short period of time with the UV having a wavelength of approximately 380 nm and a light intensity of 150 w/cm$^2$ or more.

(11) In some embodiments, in the method according to (9) described above, the curing may include using the UV convergent irradiation device that includes any one of a high pressure mercury lamp, a low pressure mercury lamp, a metal halide lamp, a xenon lamp, a black light blue lamp, a chemical lamp, a fluorescent tube UV lamp, and an excimer lamp, as the light source.

In the method according to (11) described above, the effect described in any one of the embodiments above can be obtained with the UV curable resin cured by using the UV convergent irradiation device that includes any one of a high pressure mercury lamp, a low pressure mercury lamp, a metal halide lamp, a xenon lamp, a black light blue lamp, a chemical lamp, a fluorescent tube UV lamp, and an excimer lamp, as the light source.

(12) In some embodiments, in the method according to (9) described above, the curing may include using the UV convergent irradiation device that includes a lens configured to collect or diffuse the UV emitted from an LED serving as the light source.

In the method according to (12) described above, the effect described in any one of the embodiments above can be obtained with the UV curable resin cured by using the UV convergent irradiation device that includes the lens configured to collect or diffuse the UV emitted from the LED serving as the light source.

(13) In some embodiments, the method according to any one of (1) to (12) described above may further include a step of implementing treatment of performing sanding on a step at a boundary portion between a surface of the cured UV curable resin and the outer skin of the wind turbine blade, and applying a surface coating agent at least on the surface after the sanding or attaching a sheet material at least to the surface.

In the method according to (13) described above, the level difference of the step at the boundary portion between the surface of the cured UV curable resin and the outer skin of the wind turbine blade can be reduced by the sanding. Furthermore, the surface after the sanding can be smoothly finished with the surface coating agent or the sheet material.

(14) In some embodiments, in the method according to (13) described above, the implementing treatment includes performing flattening so that the step has a level difference of 200 µm or less.

In the method according to (14) described above, the flattening can be performed on the boundary portion between the repair member and the blade outer skin to further reduce the level difference of the step.

(15) In some embodiments, in the method according to any one of (1) to (14) described above, the placing may include using a rolling member to make the UV curable resin come into close contact with the repair target portion.

In the method according to (15) described above, the rolling member is used so that the UV curable resin can be more effectively brought into close contact with the repair target portion of the wind turbine blade, compared with a case where the rolling member is not used.

At least one embodiment of the disclosure can provide a method of repairing the wind turbine blade enabling the strength of the repair member after the attachment to be determined.

BRIEF DESCRIPTION OF DRAWINGS

FIG. 9 is a flowchart illustrating a method of repairing a wind turbine blade according to another embodiment;

DETAILED DESCRIPTION

Figure 1:
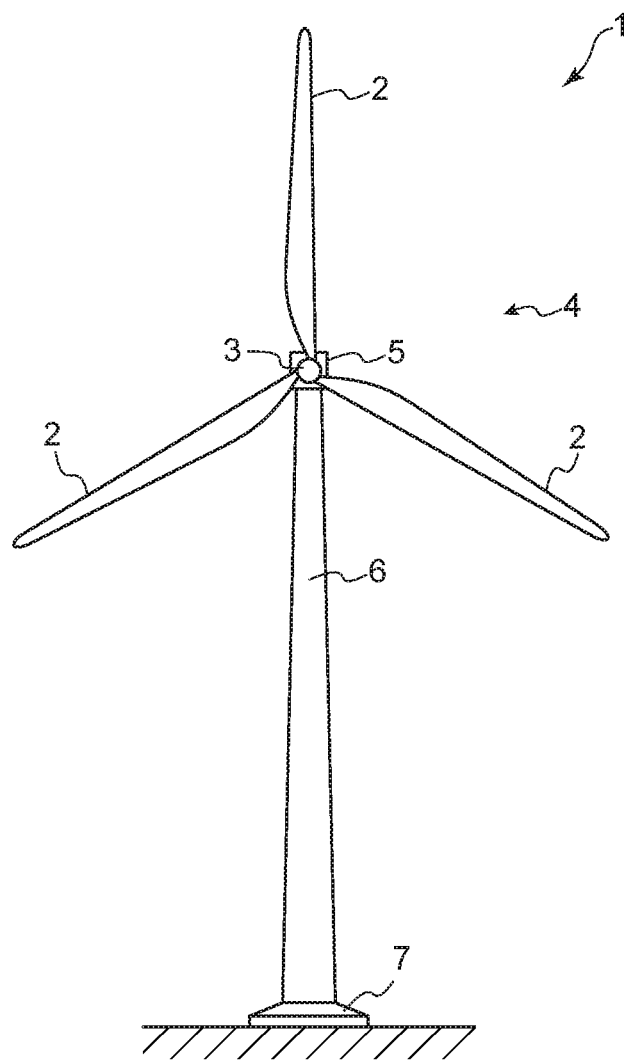
FIG. 1 is a schematic view illustrating a wind turbine according to one embodiment.

Some embodiments of the disclosure are described with reference to the accompanying drawings. The size, material, shape, other relative arrangements, and the like described as embodiments or illustrated in the drawings are not intended to limit the scope of the disclose to these, and are merely illustrative.

For example, expressions that represent relative or absolute arrangements such as "in a direction", "along a direction", "parallel", "perpendicular", "center", "concentric", or "coaxial" refer not only to what exactly these expressions represent but also to states that allow tolerance or are relatively displaced by such a degree of angle or distance that can achieve the same functions.

For example, expressions that means things are in an identical state such as "same", "identical", or "homogenous" refer not only to exactly identical states but also to states that allow tolerance or include such a difference that can achieve the same functions.

For example, expressions on shapes such as rectangular or cylindrical refer not only to shapes such as rectangular or cylindrical in a geometrically exact sense but also to such shapes that include protrusions, recesses, chamfered parts, or the like as long as the same functions are available.

Expressions of "comprising", "including", "being provided with", "containing", or "having" one component are not exclusive expressions that would exclude the existence of other component(s).

Figure 2:
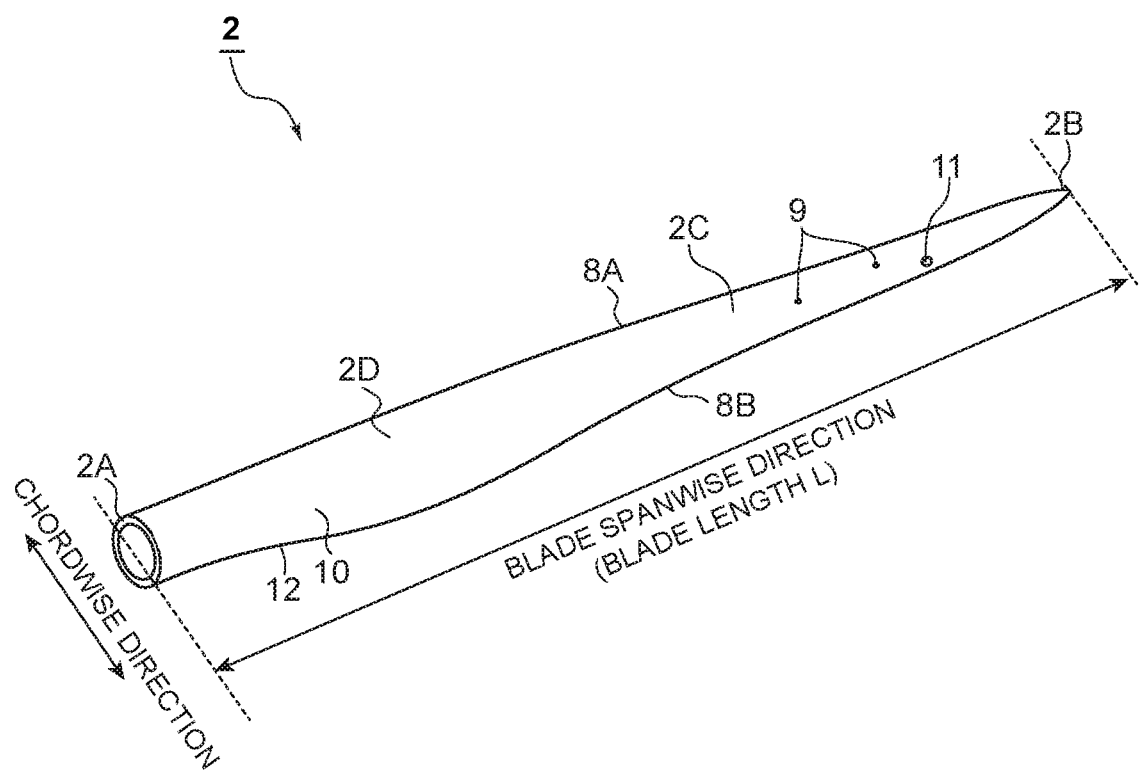
FIG. 2 is a perspective view illustrating an entire wind turbine blade according to one embodiment.

FIG. 1 is a schematic view illustrating a wind turbine according to one embodiment, and FIG. 2 is a perspective view illustrating an entire wind turbine blade according to one embodiment.

As illustrated in FIG. 1, a wind turbine power generation facility according to at least some embodiments of the disclosure (hereinafter, referred to as a wind turbine 1) includes: a rotor 4 including a plurality of (three in the example illustrated in FIG. 1) wind turbine blades 2 and a hub 3 to which the wind turbine blades 2 are attached; a nacelle 5 that rotatably supports the rotor 4 via a main shaft and a main bearing (not illustrated); a tower 6 supporting the nacelle 5 yaw-rotatably; and a base 7 on which the tower 6 is installed. The number of wind turbine blades 2 may be more than or less than three.

As illustrated in FIG. 2, in some embodiments, the wind turbine blades 2 each include a blade main body 2C extending from a blade root portion 2A to a blade tip portion 2B, along a longitudinal direction (blade spanwise direction).

The blade main body 2C includes: the blade root portion 2A attached to the hub 3 of the wind turbine 1; the blade tip portion 2B that is a portion farthest from the hub 3; and an airfoil portion 2D extending between the blade root portion 2A and the blade tip portion 2B along the blade spanwise direction. The blade main body 2C further includes a leading edge 8A and a trailing edge 8B both extending from the blade root portion 2A to the blade tip portion 2B. The blade main body 2C has an outer shape defined by a front surface 10 (suction surface) and a back surface 12 (pressure surface) opposite to the front surface 10.

The "blade spanwise direction" as used in this specification is a direction between the blade root portion 2A and the blade tip portion 2B, and a "chordwise direction (blade chordwise direction)" is a direction along a line (chord)

between the leading edge 8A and the trailing edge 8B of the blade main body 2C. The "blade root portion" is a cylindrical portion of the wind turbine blade 2, with a substantially circular cross-sectional shape. The blade root portion is within a range of 5 m, for example, in the blade spanwise direction from a blade-root-side end surface of the blade main body 2C of the wind turbine blade 2 (typically within a range of 1 to 3 m from the end surface).

Figure 3:
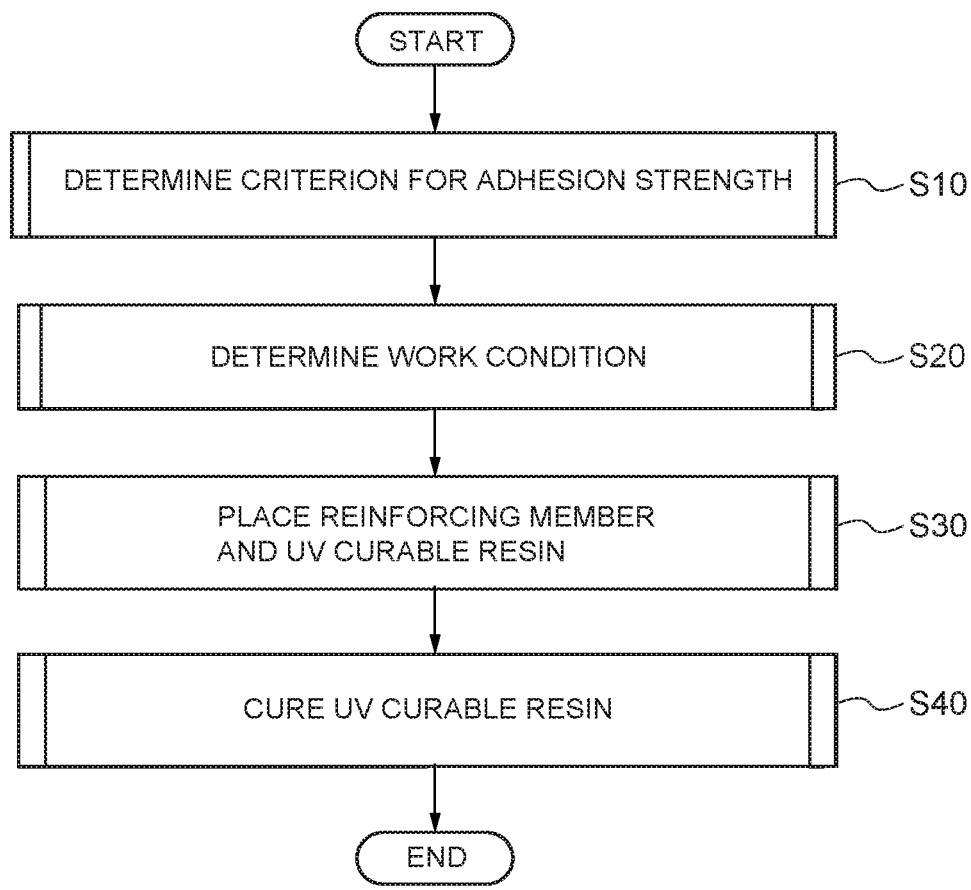
FIG. 3 is a flowchart illustrating a method of repairing or reinforcing a wind turbine blade, or attaching an accessory part to the wind turbine blade according to one embodiment.
Figure 4:
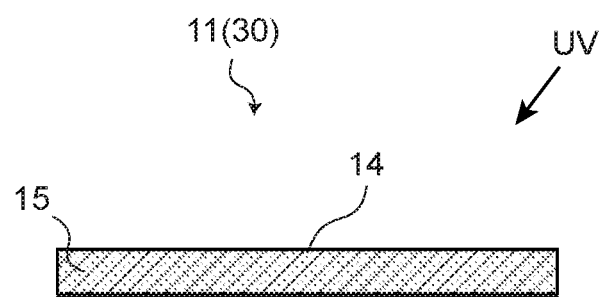
FIG. 4 is a side cross-sectional view illustrating a method of repairing a wind turbine blade according to one embodiment.

FIG. 3 is a flowchart illustrating a method of repairing or reinforcing a wind turbine blade, or attaching an accessory part to the wind turbine blade according to one embodiment. FIG. 4 is a side cross-sectional view illustrating a method of repairing a wind turbine blade according to one embodiment.

As in a non-limiting example illustrated in FIG. 1 to FIG. 4, a method of repairing or reinforcing a wind turbine blade 2 or attaching an accessory part to the wind turbine blade 2 relating to at least one embodiments of the present disclosure includes: determining a criterion to be satisfied by a repair member 11 including at least one layer of reinforcing fiber 14 and a UV curable resin 15, the criterion being an adhesion strength of the repair member 11 relative to a base member 17 of a wind turbine blade 2 (step S10); determining a work condition including at least one of: dimensions of the repair member 11 in a plan view, the number of the layers of the reinforcing fiber 14 in the repair member 11, and a fiber extension direction of the reinforcing fiber 14, on the basis of a damage condition of a repair target portion 20 (see, for example, FIG. 5C, FIG. 7, FIG. 8B, FIG. 10, and FIG. 11) of the wind turbine blade 2 (step S20); placing the reinforcing fiber 14 and the UV curable resin 15 on the repair target portion 20 in accordance with the determined work condition (step S30); and obtaining the repair member 11 by curing the UV curable resin 15, with the reinforcing fiber 14 and the UV curable resin 15 being placed on the repair target portion 20 in a manner in which the adhesion strength of the repair member 11 relative to the base member 17 satisfies the criterion (step S40).

In step S10 for determining the criterion for the adhesion strength, an average value of a plurality of peel strengths, as a result of a peel test performed for a plurality of times, may be used as the criterion for the adhesion strength. The criterion for the adhesion strength is set to be an appropriate value for achieving a strength high enough for the repair member 11, provided for repairing or reinforcing the wind turbine blade 2, or for the accessory-part attachment (not illustrated), attached to the wind turbine blade 2 by using (or processing) the repair member 11 for achieving an improved function, to integrally function with the wind turbine blade 2 without peeling off from the wind turbine blade 2 for a predetermined period of time or more. The adhesion strength to be the criterion is quantitatively recognized with the test.

Step S20 for determining the work condition may be based on a size, (two-dimensional dimensions in a plan view), a shape, a thickness (the number of layers), a fiber extension direction, and the like of the repair member 11, required for repairing or reinforcing the repair target portion 20. The fiber extension direction of the reinforcing fiber 14 may be determined on the basis of the fiber extension direction or an extension direction of a damage (such as a crack for example) in the base member 17 of the repair target portion 20, so that an appropriate strength can be guaranteed.

In step S30 for the placing, auxiliary tools such as fixtures (including tapes and the like) and masking tapes may be used as appropriate.

In step S40 including curing the UV curable resin, the UV is emitted with an intensity, wavelength, and irradiation time suitable for achieving the adhesion strength of the repair member 11 satisfying the criterion. In the disclosure, the repair member 11 is a product obtained by thus emitting the UV to cur the UV curable resin 15 impregnated in the reinforcing fiber 14.

According to the method described above, the criterion for the adhesion strength of the repair member relative to the base member 17 of the wind turbine blade 2, to be satisfied by the repair member 11, is determined, the work condition is determined on the basis of the damage condition of the repair target portion 20, the reinforcing fiber 14 and the UV curable resin 15 are placed on the repair target portion 20 in accordance with the determined work condition, and the repair member 11 is obtained by curing the UV curable resin 15, with the placing performed in a manner in which the adhesion strength of the repair member 11 relative to the base member 17 satisfies the criterion. Thus, the criterion is determined with the adhesion strength of the repair member 11 relative to the base member 17 of the wind turbine blade 2 checked in advance. Then, the UV curable resin 15 is cured to satisfy the criterion. Thus, the strength the repair member 11 after the attachment can be determined. Thus, the repairing and the like can be performed at a low cost by using the repair member 11 with a sufficient strength. Furthermore, for example, the repairing and the like can be performed by using the repair member 11 that can be attached with a minimum possible impact on aerodynamics and the like of the wind turbine blade 2.

In some embodiments, in the method described above, the curing in step S40 may include irradiating a prepreg material 30 with UV, the prepreg material including at least one type of glass fiber (the reinforcing fiber 14 for example) and the UV curable resin 15 (see, for example, FIG. 4).

For example, the prepreg material 30 is obtained by impregnating resin or the like in a reinforcing material such as glass or carbon fiber, and may be used as a material for reinforced plastic.

According to the method described above, the prepreg material 30 is used so that the UV curable resin 15 needs not to be impregnated in the reinforcing fiber 14 of glass on site, whereby a work period can be largely shortened. The prepreg material 30 can have a configuration set and selected in advance to satisfy the criterion for the adhesion strength relative to the base member 17, in accordance with the base member 17 of the wind turbine blade 2. Thus, the repair member 11 having a sufficient strength can be obtained while shortening the work period.

Figure 5A:
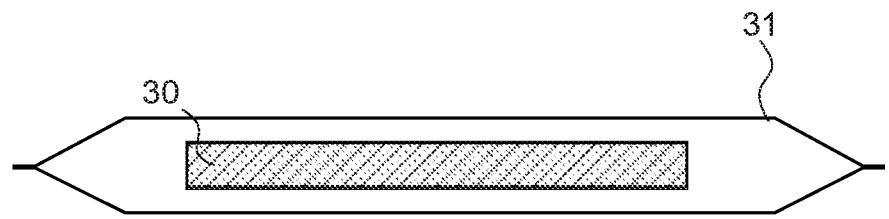
FIG. 5A to FIG. 5C are side cross-sectional views illustrating a method of repairing a wind turbine blade according to one embodiment.
Figure 5B:
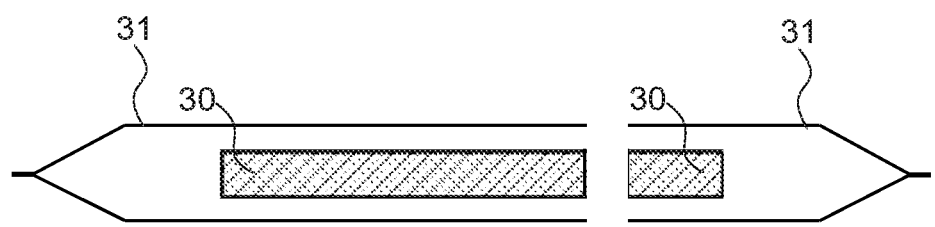
Figure 5C:
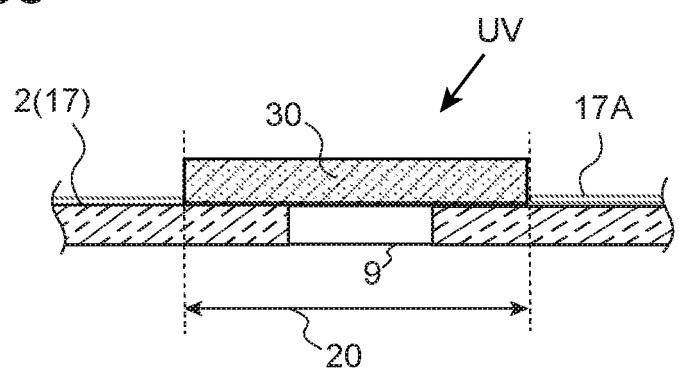

In some embodiments, in the method described above, the prepreg material 30 may be contained in a bag 31 having a light shielding property, the determination of work condition in step S20 may include measuring dimensions of a target portion 20 for repair, reinforcement, or accessory-part attachment after removing a coating film on a surface 17A of the base member 17 of the wind turbine blade 2 from the target portion 20, and the placing in step S30 may include, on the basis of the dimensions, cutting the prepreg material 30, contained in the bag 31, together with the bag 31, and removing the bag 31 that has been cut, and then adhering the prepreg material 30 to the repair target portion 20 (see, for example, FIG. 5A, FIG. 5B, and FIG. 5C).

According to the method described above, the coating film on the surface 17A of the base member 17 of the wind turbine blade 2 is removed from the target portion 20 for repair, reinforcement, or accessory-part attachment, so that the dimensions of the target portion 20 can be accurately measured. Furthermore, the prepreg material 30, contained in the bag 31, is cut on the basis of the measured dimension, so that the prepreg material 30, to be attached to the target portion 20, can be cut to have dimensions required for satisfying the criterion for the adhesion strength relative to the base member 17. The prepreg material 30 is cut together with the bag 31 having a light shielding property, so as not to be irradiated with light as much as possible before being adhered to the base member 17. Thus, the adhered prepreg material 30 can more conform to the surface 17A of the base member 17 of the wind turbine blade 2, and an appropriate adhesion strength satisfying the criterion can be guaranteed.

In some embodiments, any of the methods described above may further include a step of checking whether a peel strength of the prepreg material 30 that has been cured is equal to or larger than 3 MPa (step S1) (see, for example, FIG. 9).

The peel strength may be an average value of results obtained by performing a peel test for a plurality of times, for example.

According to the method described above, the prepreg material 30 that has been checked to have a peel strength of 3 MPa or more after being cured can be used for repairing or reinforcing the wind turbine blade 2 or for attaching an accessory part to the wind turbine blade 2. Thus, the determinations in steps for satisfying the criterion for the adhesion strength can be more appropriately made.

Figure 6:
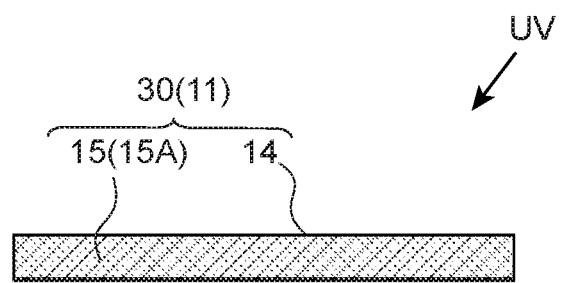
FIG. 6 is a side cross-sectional view illustrating a method of repairing a wind turbine blade according to one embodiment.

In some embodiments, in the method according to any of the embodiments described above, the UV curable resin 15 may include vinyl ester or polyester and a UV curable agent 15A impregnated in the vinyl ester or polyester (see, for example, FIG. 6).

According to the method described above, the effect described in any of the embodiments described above can be obtained by using the repair member 11 including the UV curable resin 15 including vinyl ester or polyester and the UV curable agent 15A impregnated in the vinyl ester or polyester.

Figure 7:
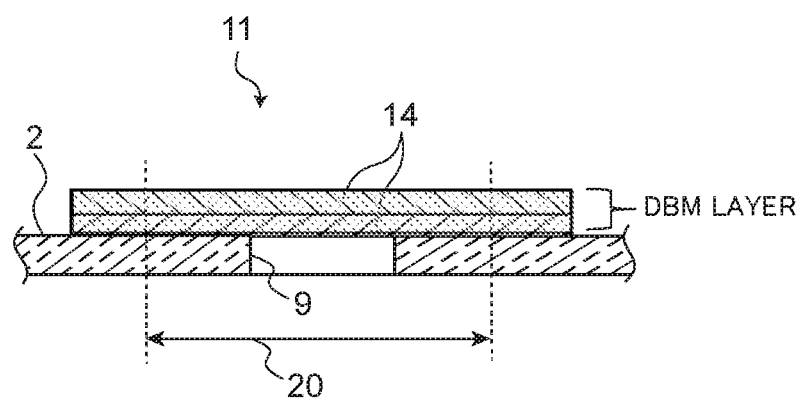
FIG. 7 is a side cross-sectional view illustrating a method of repairing a wind turbine blade according to one embodiment.

In some embodiments, in the method according to any of the embodiments described above, the glass fiber 14 may include at least one of unidirection (UD) where the fiber extension direction is uniform and a double bias mat (DBM) including at least two fiber layers with different extension directions (see, for example, FIG. 7).

According to the method described above, in step S20 for determining the work condition, at least one of the UD where the fiber extension direction of the reinforcing fiber 14 is uniform and the DBM may be determined to be included, on the basis of the damage condition of the repair target portion 20 in the wind turbine blade 2. Furthermore, in step S30 for the placing, the reinforcing fiber 14 and the UV curable resin 15 may be placed on the repair target portion 20 in accordance with the work condition. The repair member 11 can be formed with: the glass fiber 14 including at least one of UD and DBM; and the UV curable resin 15. Thus, the repair member 11 that is more effectively integrated with the base member 17 can be used for repairing, reinforcing, and accessory-part attachment for the base member 17 of the wind turbine blade 2 including fiber reinforced plastic (FRP) material or the like for example.

Figure 8A:
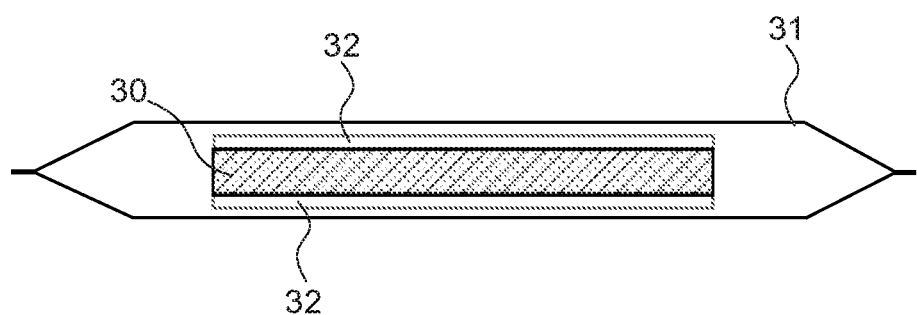
FIG. 8A and FIG. 8B are side cross-sectional views illustrating a method of repairing a wind turbine blade according to one embodiment.
Figure 8B:
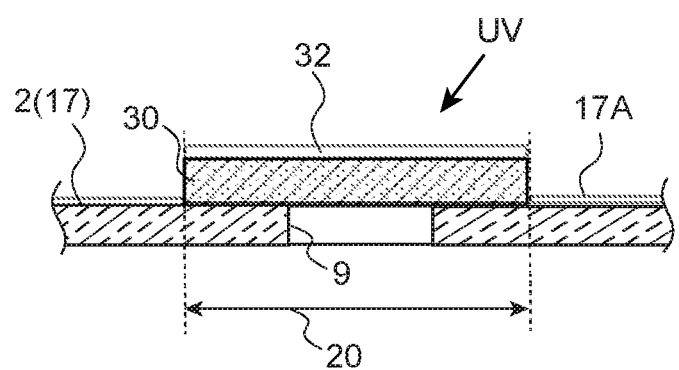

In some embodiments, in the method according to any of the embodiments described above, the placing in step S30 may include using the prepreg material 30 attached with a transparent film 32 on each surface thereof (see, for example, FIG. 8A), and the curing in step S40 may include irradiating the prepreg material 30 with the UV, with the transparent film 32 being attached to an opposite surface of the prepreg material 30 to a surface facing an outer skin (surface 17A) of the wind turbine blade 2 (see, for example, FIG. 8B).

According to the method described above, the prepreg material 30 can be irradiated with the UV, with the transparent film 32 covering the upper surface of the prepreg material 30 in close contact with the outer skin (surface 17A) of the wind turbine blade 2. Thus, the resin can be cured while preventing the prepreg material 30 from being dried or oxidized, losing shape, or having a foreign object attached thereon. The transparent film 32 is peeled after the curing, so that the prepreg material 30 can be easily handled during the repairing operation.

Figure 10:
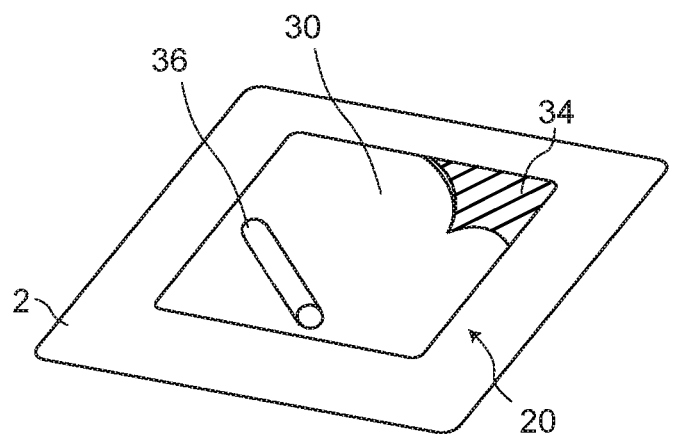
FIG. 10 is a perspective view illustrating a method of repairing a wind turbine blade according to another embodiment.

In some embodiments, the method according to any of the embodiments described above may further include a step of performing a surface treatment on the base member 17 by using a primer 34 that has unsaturated polyester and styrene as main components and is bondable to the UV curable resin 15, before implementing the placing in step S30 (step S22) (see, for example, FIG. 9 and FIG. 10).

According to the method described above, the surface treatment is performed on the base member 17 by using the primer 34. This ensures a higher bonding or adhesion strength between the repair member 11 and the base member 17.

Figure 12:
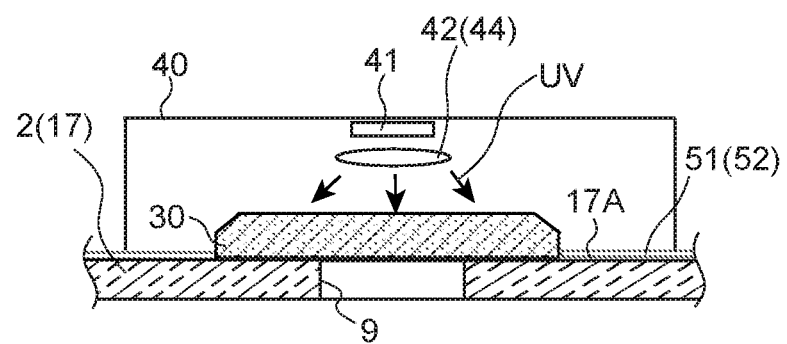
FIG. 12 is a schematic view illustrating a method of repairing a wind turbine blade according to another embodiment.

In some embodiments, in the method according to any of the embodiments described above, a step of curing (step S40) may include using a UV convergent irradiation device 40 including a light source 41, and a concentrator (or a diffuser) 42 arranged on an optical path of the light source 41 (see FIG. 12).

According to the method described above, the UV emitted from the light source 41 can be collected by the concentrator 42 or diffused by the diffuser. With the UV convergent irradiation device 40 thus used, the repair member 11 can be more appropriately irradiated with the UV to be cured.

In some embodiments, in the method according to any of the embodiments described above, the curing in step S40 may include irradiating the UV curable resin 15 with the UV having a wavelength of approximately 380 nm and a light intensity of 150 w/cm$^2$ or more.

According to the method described above, the UV curable resin 15 can be effectively cured in a short period of time with the UV having a wavelength of approximately 380 nm and a light intensity of 150 w/cm$^2$ or more.

In some embodiments, in the method according to any of the embodiments described above, the curing in step S40 includes using the UV convergent irradiation device 40 that includes any one of a high pressure mercury lamp, a low pressure mercury lamp, a metal halide lamp, a xenon lamp, a black light blue lamp, a chemical lamp, a fluorescent tube UV lamp, and an excimer lamp, as the light source 41.

According to the method described above, the effect described in any one of the embodiments described above can be obtained with the UV curable resin 15 cured by using the UV convergent irradiation device 40 that includes any one of a high pressure mercury lamp, a low pressure mercury lamp, a metal halide lamp, a xenon lamp, a black light blue lamp, a chemical lamp, a fluorescent tube UV lamp, and an excimer lamp, as the light source.

In some embodiments, in the method according to any of the embodiments described above, the curing in step S40 may include using the UV convergent irradiation device 40 that includes a lens 44 configured to collect or diffuse the UV emitted from an LED serving as the light source 41 (see FIG. 12).

According to the method described above, the effect described in any one of the embodiments described above can be obtained with the UV curable resin 15 cured by using the UV convergent irradiation device 40 that includes the lens 44 configured to collect or diffuse the UV emitted from the LED serving as the light source 41.

Figure 11:
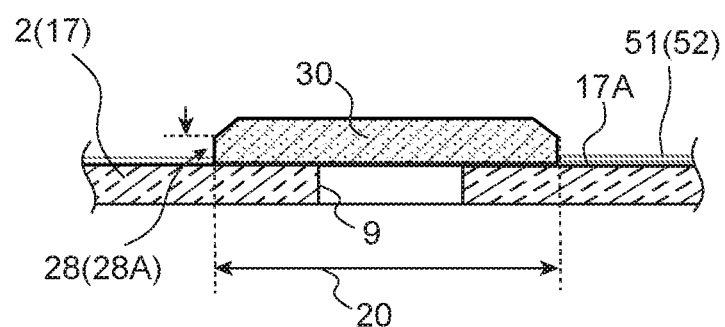
FIG. 11 is a side cross-sectional view illustrating a method of repairing a wind turbine blade according to another embodiment.

In some embodiments, the method according to any of the embodiments described above may further include a step (step S50) of implementing treatment of performing sanding on a step 28A at a boundary portion 28 between a surface of the cured UV curable resin 15 and the outer skin (surface 17A) of the wind turbine blade 2, and applying a surface coating agent 51 at least on the surface 17A after the sanding or attaching a sheet material 52 at least to the surface 17A (see, for example, FIG. 9 and FIG. 11).

According to the method described above, the level difference of the step 28A at the boundary portion between the surface 17A of the cured UV curable resin 15 and the outer skin (surface 17A) of the wind turbine blade 2 can be reduced by the sanding. Furthermore, the surface 17A after the sanding can be smoothly finished with the surface coating agent 51 or the sheet material 52.

In some embodiments, in the method described above, the implementing treatment in step S50 includes performing flattening so that the step 28A has a level difference of 200 μm or less (see, for example, FIG. 11).

According to the method described above, the flattening can be performed on the boundary portion 28 between the repair member 11 and the blade outer skin (surface 17A) to further reduce the level difference of the step 28A.

In some embodiments, in the method according to any of the embodiments described above, the placing in step S30 includes using a rolling member 36 to make the UV curable resin 15 come into close contact with the repair target portion 20 (see, for example, FIG. 10).

According to the method described above, the rolling member 36 is used so that the UV curable resin 15 can be more effectively brought into close contact with the repair target portion 20 of the wind turbine blade 2, compared with a case where the rolling member 36 is not used.

The method described above can provide a method of repairing the wind turbine blade 2 enabling the strength of the repair member 11 after the attachment to be determined.

While some embodiments of the disclosure have been described, it should be noted that the disclosure is not limited to the embodiments described above and also includes embodiments with modifications to the embodiments described above and a combination of these embodiments.

The invention claimed is:

1. A method of repairing or reinforcing a wind turbine blade, or attaching an accessory part to the wind turbine blade, the method comprising the steps of:
    determining a criterion to be satisfied by a repair member including at least one layer of reinforcing fiber and a UV curable resin, the criterion being an adhesion strength of the repair member relative to a base member of a wind turbine blade;
    determining a work condition including at least one of: dimensions of the repair member in a plan view, the number of the layers of the reinforcing fiber in the repair member, and a fiber extension direction of the reinforcing fiber, on a basis of a damage condition of a repair target portion of the wind turbine blade;
    placing the reinforcing fiber and the UV curable resin on the repair target portion in accordance with the determined work condition; and
    obtaining the repair member by curing the UV curable resin, with the reinforcing fiber and the UV curable resin being placed on the repair target portion in a manner in which the adhesion strength of the repair member relative to the base member satisfies the criterion,
    wherein the determination of the work condition includes measuring dimensions of the repair target portion after removing a coating film on a surface of the base member of the wind turbine blade from the repair target portion,
    wherein the placing includes:
        on the basis of the dimensions, cutting a prepreg material including a resin composition containing at least one type of glass fiber and the UV curable resin and a transparent film attached on each surface of the resin composition while the prepreg material is contained in a bag having a light shielding property, the prepreg material being cut together with the bag into a size which satisfies the criterion of the adhesion strength; and
        removing the bag that has been cut, and then adhering the prepreg material to the repair target portion, and
    wherein the curing includes irradiating the prepreg material with UV light through the transparent film, with the transparent film being attached to an opposite surface of the prepreg material to a surface facing an outer skin of the wind turbine blade.

2. The method of repairing or reinforcing a wind turbine blade, or attaching an accessory part to the wind turbine blade according to claim 1, further comprising a step of checking whether a peel strength of the prepreg material that has been cured is equal to or larger than 3 MPa.

3. The method of repairing or reinforcing a wind turbine blade, or attaching an accessory part to the wind turbine blade according to claim 1, wherein
    the UV curable resin includes vinyl ester or polyester and a UV curable agent impregnated in the vinyl ester or polyester.

4. The method of repairing or reinforcing a wind turbine blade, or attaching an accessory part to the wind turbine blade according to claim 1, wherein
    the glass fiber includes at least one of unidirectional fiber where the fiber extension direction is uniform and a double bias mat including at least two fiber layers with different extension directions.

5. The method of repairing or reinforcing a wind turbine blade, or attaching an accessory part to the wind turbine blade according to claim 1, further comprising a step of performing a surface treatment on the base member by using a primer that has unsaturated polyester and styrene as main components and is bondable to the UV curable resin, before implementing the placing.

6. The method of repairing or reinforcing a wind turbine blade, or attaching an accessory part to the wind turbine blade according to claim 1, wherein the curing includes using a UV convergent irradiation device including a light source, and a concentrator or a diffuser arranged on an optical path of the light source.

7. The method of repairing or reinforcing a wind turbine blade, or attaching an accessory part to the wind turbine blade according to claim 6, wherein the curing includes using the UV convergent irradiation device that includes any one of a high pressure mercury lamp, a low pressure mercury lamp, a metal halide lamp, a xenon lamp, a black light blue lamp, a chemical lamp, a fluorescent tube UV lamp, and an excimer lamp, as the light source.

8. The method of repairing or reinforcing a wind turbine blade, or attaching an accessory part to the wind turbine blade according to claim 6, wherein the curing includes using the UV convergent irradiation device that includes a lens configured to collect or diffuse the UV light emitted from an LED serving as the light source.

9. The method of repairing or reinforcing a wind turbine blade, or attaching an accessory part to the wind turbine blade according to claim 1, wherein the curing includes irradiating the UV curable resin with the UV light having a wavelength of approximately 380 nm and a light intensity of 150 W/cm$^2$ or more.

10. The method of repairing or reinforcing a wind turbine blade, or attaching an accessory part to the wind turbine blade according to claim 1, further comprising a step of implementing treatment of performing sanding on a step at a boundary portion between a surface of the cured UV curable resin and the outer skin of the wind turbine blade, and applying a surface coating agent at least on the outer skin after the sanding or attaching a sheet material at least to the outer skin.

11. The method of repairing or reinforcing a wind turbine blade, or attaching an accessory part to the wind turbine blade according to claim 10, wherein the implementing treatment includes performing flattening so that the step has a level difference of 200 μm or less.

12. The method of repairing or reinforcing a wind turbine blade, or attaching an accessory part to the wind turbine blade according to claim 1, wherein the placing includes using a rolling member to make the UV curable resin come into close contact with the repair target portion.

* * * * *